(12) United States Patent
Dent et al.

(10) Patent No.: US 8,548,911 B2
(45) Date of Patent: Oct. 1, 2013

(54) DEVICES AND METHODS FOR DISASTER-RELIEF SUPPORT

(75) Inventors: Nathan Dent, Concord, NC (US); James Dolphin, Charlotte, NC (US); Richard L. Fitzgerald, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/369,534

(22) Filed: Feb. 9, 2012

(65) Prior Publication Data

US 2013/0211859 A1    Aug. 15, 2013

(51) Int. Cl.
*G06Q 40/00* (2012.01)

(52) U.S. Cl.
USPC .............. 705/42; 705/43; 705/44; 705/26.41; 705/35; 705/39; 705/4

(58) Field of Classification Search
None
See application file for complete search history.

(56) References Cited

U.S. PATENT DOCUMENTS

| | | | | | |
|---|---|---|---|---|---|
| 4,841,897 | A | * | 6/1989 | Claflin | 114/344 |
| 5,726,430 | A | * | 3/1998 | Ruggirello | 235/379 |
| 5,793,882 | A | * | 8/1998 | Piatek et al. | 382/115 |
| 6,179,358 | B1 | * | 1/2001 | Hirayama et al. | 296/24.38 |
| 7,007,761 | B1 | * | 3/2006 | Johnson, IV | 169/24 |
| 7,280,038 | B2 | * | 10/2007 | Robinson | 340/506 |
| 7,312,712 | B1 | * | 12/2007 | Worrall | 340/573.4 |
| 7,377,835 | B2 | * | 5/2008 | Parkulo et al. | 455/521 |
| 7,391,298 | B1 | * | 6/2008 | Campbell et al. | 340/286.02 |
| 7,460,020 | B2 | * | 12/2008 | Reyes et al. | 340/573.1 |
| 7,475,809 | B2 | * | 1/2009 | Romary | 235/379 |
| 7,634,361 | B2 | * | 12/2009 | Levesque et al. | 702/19 |
| 7,735,726 | B2 | * | 6/2010 | Bjoraker et al. | 235/380 |
| 7,783,316 | B1 | * | 8/2010 | Mitchell | 455/521 |
| 7,809,595 | B2 | * | 10/2010 | Breslin et al. | 705/7.28 |
| 7,817,982 | B1 | * | 10/2010 | Chu et al. | 455/404.1 |
| 7,909,247 | B2 | * | 3/2011 | Bonalle et al. | 235/380 |
| 8,009,035 | B1 | * | 8/2011 | Vallaire | 340/539.1 |
| 8,011,578 | B2 | * | 9/2011 | Bjoraker et al. | 235/380 |
| 8,013,733 | B1 | * | 9/2011 | Vallaire | 340/539.1 |
| 8,045,455 | B1 | * | 10/2011 | Agronow et al. | 370/229 |
| 8,224,285 | B2 | * | 7/2012 | Sennett et al. | 455/404.1 |
| 8,274,897 | B1 | * | 9/2012 | Pons et al. | 370/238 |
| 8,280,364 | B1 | * | 10/2012 | Sennett et al. | 455/419 |
| 2002/0077137 | A1 | * | 6/2002 | Akhteruzzaman et al. | 455/521 |
| 2002/0171552 | A1 | * | 11/2002 | Tate | 340/573.1 |
| 2002/0184150 | A1 | * | 12/2002 | Wong et al. | 705/42 |
| 2002/0188522 | A1 | * | 12/2002 | McCall et al. | 705/26 |
| 2003/0069002 | A1 | * | 4/2003 | Hunter et al. | 455/404 |
| 2003/0093789 | A1 | * | 5/2003 | Zimmerman et al. | 725/34 |
| 2003/0125998 | A1 | * | 7/2003 | McKenney et al. | 705/7 |
| 2003/0212494 | A1 | * | 11/2003 | Alexander et al. | 702/5 |

(Continued)

OTHER PUBLICATIONS

Wireless/Portable Internet Data Center Facility; IBM technical Disclosure Bulletin, Nov. 2001, UK; 2-pages.*

*Primary Examiner* — Gregory Johnson
(74) *Attorney, Agent, or Firm* — Weiss & Arons LLP; Michael Springs (57) ABSTRACT

Methods and apparatus according to the invention are directed towards providing a client support in the wake of a disaster impacting a locale. Support may include transporting support-means to the locale, authenticating identification of the client, interfacing with an entity administering an account for the client, and facilitating access by the client to the account. The methods and apparatus may also provide support of non-account-related disaster-relief efforts associated with the locale.

21 Claims, 3 Drawing Sheets

(56) References Cited

U.S. PATENT DOCUMENTS

| | | | |
|---|---|---|---|
| 2004/0023635 A1* | 2/2004 | Impson et al. | 455/404.1 |
| 2004/0070515 A1* | 4/2004 | Burkley et al. | 340/825.49 |
| 2004/0102178 A1* | 5/2004 | Williams | 455/404.1 |
| 2004/0192353 A1* | 9/2004 | Mason et al. | 455/457 |
| 2005/0001720 A1* | 1/2005 | Mason et al. | 340/539.13 |
| 2005/0060211 A1* | 3/2005 | Xiao et al. | 705/6 |
| 2005/0165633 A1* | 7/2005 | Huber | 705/8 |
| 2005/0197775 A1* | 9/2005 | Smith | 702/3 |
| 2005/0201527 A1* | 9/2005 | Meer et al. | 379/45 |
| 2005/0240378 A1* | 10/2005 | Smith et al. | 702/188 |
| 2005/0264412 A1* | 12/2005 | Levesque et al. | 340/517 |
| 2005/0273330 A1* | 12/2005 | Johnson | 704/246 |
| 2005/0282518 A1* | 12/2005 | D'Evelyn et al. | 455/404.1 |
| 2006/0089893 A1* | 4/2006 | Joseph et al. | 705/35 |
| 2006/0103154 A1* | 5/2006 | Berry | 296/24.39 |
| 2006/0144598 A1* | 7/2006 | Johnson, IV | 169/24 |
| 2006/0158329 A1* | 7/2006 | Burkley et al. | 340/539.13 |
| 2006/0265489 A1* | 11/2006 | Moore | 709/223 |
| 2007/0048710 A1* | 3/2007 | Olson | 434/262 |
| 2007/0103292 A1* | 5/2007 | Burkley et al. | 340/539.13 |
| 2007/0108270 A1* | 5/2007 | Bjoraker et al. | 235/380 |
| 2007/0124144 A1* | 5/2007 | Johnson | 704/246 |
| 2007/0139182 A1* | 6/2007 | O'Connor et al. | 340/521 |
| 2007/0216572 A1* | 9/2007 | Schnabel | 342/357.1 |
| 2007/0219814 A1* | 9/2007 | Moore | 705/1 |
| 2007/0219818 A1* | 9/2007 | Duthler et al. | 705/1 |
| 2007/0228145 A1* | 10/2007 | Diemer | 235/379 |
| 2007/0275690 A1* | 11/2007 | Hunter et al. | 455/404.2 |
| 2007/0296575 A1* | 12/2007 | Eisold et al. | 340/539.16 |
| 2008/0017709 A1* | 1/2008 | Kennedy | 235/385 |
| 2008/0053992 A1* | 3/2008 | DeBord | 220/1.6 |
| 2008/0088428 A1* | 4/2008 | Pitre et al. | 340/506 |
| 2008/0120639 A1* | 5/2008 | Walter et al. | 725/33 |
| 2008/0165949 A9* | 7/2008 | Hancock | 379/387.01 |
| 2008/0270208 A1* | 10/2008 | Kuczun et al. | 705/7 |
| 2008/0278311 A1* | 11/2008 | Grange et al. | 340/539.2 |
| 2008/0311894 A1* | 12/2008 | Klein et al. | 455/414.2 |
| 2008/0313087 A1* | 12/2008 | Joseph et al. | 705/66 |
| 2008/0318547 A1* | 12/2008 | Ballou et al. | 455/410 |
| 2008/0320572 A1* | 12/2008 | Connell et al. | 726/6 |
| 2009/0018869 A1* | 1/2009 | Greischar et al. | 705/2 |
| 2009/0018875 A1* | 1/2009 | Monatesti et al. | 705/7 |
| 2009/0093952 A1* | 4/2009 | Lassiter, Sr. | 701/117 |
| 2009/0099874 A1* | 4/2009 | Moncrease | 705/3 |
| 2009/0124232 A1* | 5/2009 | D'Arcy et al. | 455/404.1 |
| 2009/0196234 A1* | 8/2009 | Greene et al. | 370/328 |
| 2009/0233623 A1* | 9/2009 | Johnson | 455/456.3 |
| 2009/0239497 A1* | 9/2009 | Sennett et al. | 455/404.1 |
| 2009/0295560 A1* | 12/2009 | Koliopoulos | 340/471 |
| 2009/0325538 A1* | 12/2009 | Sennett et al. | 455/404.2 |
| 2010/0049485 A1* | 2/2010 | Lee | 703/6 |
| 2010/0057502 A1* | 3/2010 | Arguelles et al. | 705/5 |
| 2010/0150122 A1* | 6/2010 | Berger et al. | 370/338 |
| 2010/0250378 A1* | 9/2010 | Bjoraker et al. | 705/17 |
| 2011/0003576 A1* | 1/2011 | Sun et al. | 455/404.1 |
| 2011/0081884 A1* | 4/2011 | Sennett et al. | 455/404.2 |
| 2011/0117878 A1* | 5/2011 | Barash et al. | 455/404.2 |
| 2011/0130636 A1* | 6/2011 | Daniel et al. | 600/301 |
| 2011/0181408 A1* | 7/2011 | Greenis | 340/539.1 |
| 2011/0181443 A1* | 7/2011 | Gutierrez et al. | 340/990 |
| 2011/0215985 A1* | 9/2011 | Kaplan et al. | 343/879 |
| 2012/0028600 A1* | 2/2012 | Vallaire | 455/404.2 |
| 2012/0030124 A1* | 2/2012 | Cronkright et al. | 705/316 |
| 2012/0046822 A1* | 2/2012 | Anderson | 701/29.1 |
| 2012/0047187 A1* | 2/2012 | Daus | 707/805 |
| 2012/0066139 A1* | 3/2012 | Guzman et al. | 705/319 |
| 2012/0076134 A1* | 3/2012 | Brownrigg | 370/352 |
| 2012/0078787 A1* | 3/2012 | Mehew et al. | 705/44 |
| 2012/0150783 A1* | 6/2012 | Jung et al. | 706/46 |
| 2012/0282875 A1* | 11/2012 | Park et al. | 455/404.1 |

\* cited by examiner

DEVICES AND METHODS FOR DISASTER-RELIEF SUPPORT

FIELD OF TECHNOLOGY

This disclosure relates to granting access to accounts, to other financial institution services and to wider information-exchange services under circumstances in which such access may not typically be available, such as in the wake of a regional disaster. More specifically, this invention relates to issuing financial instruments capable of accessing an account, such issuing being to a client requesting access to the accounts but not in possession of physical documentation of being a holder of the account.

BACKGROUND OF THE INVENTION

A financial institution accountholder typically uses one or more channels to access funds that the accountholder maintains in a financial institution account. The channels may include a brick-and-mortar banking institution customer service office, a telephone-based banking institution customer service agency, a self-service device (such as an automated teller machine ("ATM")) and an on-line banking portal. The accountholder may interact with the on-line banking portal via a fixed communication device or a mobile communication device.

The banking institution (hereinafter, "bank") may typically require that a customer present to the bank information authenticating the identification of the customer as the accountholder before the bank grants the customer access to the account. The bank may require that the customer present the authentication information through the one or more channels.

Exemplary identity-authentication information may include: a physical article of documentation that the customer possesses (e.g., an ATM card or photograph-bearing identification, such as a driver's license); a knowledge-item that the customer knows (e.g., a personal identification number ("PIN") or a correct answer to an accountholder-chosen security question); and a biometric feature of the customer (e.g., a handprint or DNA). A typical granting of access to the account may include the customer confirming his/her being the accountholder by proffering the physical article of documentation (e.g., an ATM card) and also presenting the knowledge-item (e.g., a PIN).

There are circumstances under which an accountholder may not be in possession of any physical article of identity-authentication. Such circumstances may include calamitous events affecting primarily the accountholder, such as being the victim of pickpocketing, home-burglary or a house-fire. Without the physical article of identity-authentication, the accountholder's ability to access his/her account may be reduced, but may not be eliminated.

Under such circumstances, the accountholder may present to the bank alternate identity-authentication information, such as the accountholder's PIN and answers to account security questions. The accountholder may present the person of the accountholder to the bank for biometric readings. PINs, answers to security questions, and biometric readings may be checked against a bank database of accountholder information. Given a sufficient number of confirming matches of the customer's alternate identity-authentication information with bank database accountholder information, the bank may grant the client access to the account in the absence of client-borne physical identity-authentication documentation. On the basis of such alternate identity-authentication information confirmation, the bank may reissue to the accountholder an article of identity-authentication documentation, such as an ATM or bank credit card.

However, there are circumstances under which the bank customer without physical identity-authentication documentation may have difficulty making use of alternate identity-authentication information to gain access to his/her account. Such circumstances include a widespread calamity that severely impacts the accountholder's locale, impacting the accountholder as well as locale-based brick-and-mortar banks, among other locale-associated individuals and institutions impacted. Extreme environmental conditions (e.g., earthquakes, tsunamis, gale-force winds, blizzards, and flooding) and man-made disasters (e.g., devastating terrorist attacks and accidental catastrophes) may result in a banking customer having neither physical identity-authentication documentation nor functional locale-based banks at which to present identity-authentication information. Such widespread calamities may also severely impair infrastructure that would otherwise enable an accountholder to contact the bank via transportation means and/or via communication devices; such impairment of infrastructure may drastically reduce or effectively eliminate access to banking channels. The customer may be cut off from banking services both inside and outside the locale of the calamity.

Impairment of transportation infrastructure and/or of communications infrastructure in the wake of events such as regional disasters may be detrimental to the economy and welfare of persons and institutions of the locale. Such impairment of infrastructure within the region may also hamper coordination and implementation of disaster-relief efforts of community groups and of local governments and law-enforcement, and of larger-scale efforts such as those of the Federal Emergency Management Agency ("FEMA") and the Red Cross.

It would be desirable, therefore, to provide apparatus and methods for granting customers access to their accounts under circumstances such as disasters that may dispossess the customers of physical identity-authenticating documentation and/or that may disrupt usual banking operations. It would also be desirable to have such granting include the opening of new accounts by customers.

It would also be desirable, therefore, to provide to those impacted by impairment of locale infrastructure in the wake of such disasters—accountholders, the general public and institutions—apparatus and methods that facilitate electronic communication and information-exchange. It would also be desirable to have such electronic communication and information-exchange serve to support impacted locale-business.

It would also be desirable, therefore, to provide apparatus and methods that facilitate electronic communication and information-exchange to support locale disaster-relief efforts of locale-based groups and of groups such as FEMA and the Red Cross.

SUMMARY OF THE DISCLOSURE

It is an object of this invention to provide apparatus and methods for accountholders to access their accounts in the wake of an event—such as a regional disaster—that may dispossess accountholders of identity-authentication documentation and/or that may disrupt usual banking operations. It is also an object of this invention to provide apparatus and methods for persons and institutions of the affected locale to have access to electronic communication and information-exchange in the wake of an event that impairs local and regional electronic communications infrastructure. It is also an object of this invention to provide apparatus and methods to aid in coordination and implementation of local and regional relief efforts.

The apparatus and methods of this invention that may provide accountholders access to their accounts may accommodate banking customers opening new accounts and performing other banking operations. The apparatus and methods of this invention that provide access to electronic communication and information-exchange functions may support locale-based business operations. The apparatus and methods of this invention that support banking and/or business operations may accommodate utilization as part of local and regional relief efforts.

The apparatus of this invention may include, and the methods may involve, a mobile platform. The mobile platform may comprise a Mobile Banking Unit ("MBU"). The MBU may be capable of performing standard banking operations that may have been disrupted by the event. The MBU may be capable of performing non-standard banking operations and/or non-banking operations, either independently from or as part of the mobile platform.

The mobile platform may be capable of deployment to and within the locale of a disaster. The deployment may involve translocation to and within the locale.

The mobile platform may include a power-supplying unit, conferring on the mobile platform independence from power infrastructure of the locale in which it is deployed. The power-supplying unit may be capable of utilizing available locale-based power.

The mobile platform may include a communications unit for secure communication via satellite and/or other wireless-communication-enabling means, conferring on the mobile platform independence from communications infrastructure of the locale in which it is deployed. Thus, the mobile platform may be capable of securely exchanging information with sites within and/or beyond the deployment locale.

The mobile platform may be unstaffed in the deployment locale. Performance of functions of the mobile platform may be monitored remotely from within and/or beyond the deployment locale. Performance of functions of the mobile platform may be controlled remotely from within and/or beyond the deployment locale.

The mobile platform may be staffed by staff to facilitate MBU functions and other functions of the mobile platform. The staff may at least in part be locale-based. The locale-based staff may at least in part include, and draw on the talents and training of, available locale-based bank employees.

Functions of the mobile platform—carried out by the staff and/or through apparatus and methods of the invention—may include maintenance, transport, security, banking operations, business-support, communications, and interfacing with and between the locale-residents/citizenry and an appropriate disaster-relief agency.

The appropriate agency for interfacing may be a local governing body, a state law-enforcement body, the National Guard, FEMA or some other agency/body with authority over the locale. The appropriate agency for interfacing may be the Red Cross, an insurance company handling claims from the locale or some other agency/body with authority over relief efforts that may be provided by the mobile platform. The appropriate authoritative agency (hereinafter, "authority/agency") for interfacing may change in the course of the deployment of the mobile platform. There may be more than one authority/agency with which the mobile platform may interface in performing its functions.

A pre-deployment interface function of the mobile platform with the authority/agency may involve a determination of practicality and safety of deployment. A pre-deployment interface function of the mobile platform with the authority/agency may involve a determination of timing and/or location of the deployment. A pre-deployment interface function of the mobile platform with the authority/agency may involve a determination of a selection and extent of functions of the mobile platform to be activated upon deployment.

Such determinations may change in the course of the deployment of the mobile platform. The change may depend on assessment of the impairment of locale-infrastructure in severity, extent and forecasted duration. The change may depend on assessment of availability of resources within the locale. The change may depend on assessment of the capabilities of the deployed mobile platform. Such assessments may involve interface functions of the mobile platform with the authority/agency. Such interfacing may involve the exchange of information from the deployed mobile platform and/or from the relevant authority/agency.

The mobile platform may serve at least in part as a locale-deployed hub for some operations of the authority/agency. The mobile platform may serve at least in part as a locale-deployed hub for supporting some operations of locale-based business. The mobile platform may serve at least in part as a locale-deployed hub at which bank customers may perform some banking operations.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus, methods and media for providing locale-associated disaster-relief services are provided. The apparatus may include, and the methods and media may involve, components and functions that provide disaster-relief functions to locale-associated residents/citizenry and institutions. The disaster-relief functions provided may involve banking, business-support and/or interfacing with the authority/agency.

In the wake of the disaster, locale-infrastructure may be impaired. Functioning of the invention despite impairment of locale-infrastructure, may involve activation of the mobile platform in the locale. The mobile platform may be associated with an entity. The mobile platform may be activated by the entity. The entity may be a bank. The mobile unit may include an ATM. The mobile platform may serve as a platform for other apparatus, methods and media of the invention.

The apparatus may include, and the methods and media may involve, a receiver for receiving information involved in the functioning of the invention. The receiver may be configured to receive information from a client. The information received from the client may be identification information. The identification information may be associated with an identity claimed by the client. The client may be a locale-associated resident/citizen, banking customer, entity-accountholder, institution and/or business. The client may have been impacted by the disaster. The client may have been dispossessed of client-borne documentation of client-identification.

The identification information received by the receiver may comprise information contained in client-borne documentation such as a driver's license. The identification information received by the receiver may comprise an item of client-knowledge (e.g., a Social Security number). The identification information received by the receiver may comprise biometric information pertaining to the client (e.g., a fingerprint, a voiceprint). The identification information received by the receiver may include the client's name, address, photograph, biometric data and/or any other suitable identifying information. The identification information received by the receiver may include bank-relevant information (e.g., an account number, a PIN, an answer to a bank security question).

The apparatus may include, and the methods and media may involve, a logic processing unit for processing information involved in the functioning of the invention. The logic processing unit may process the identification information received by the receiver.

Processing of the identification information of the client may include correlation of the identification information with stored information accessible to the mobile platform. Stored information accessible to the mobile platform may be resident on the mobile platform and/or may be accessed via the communications unit of the mobile platform. Stored information used in such correlation may include information contained in bank records, property ownership records, credit-rating files, government files, disaster rolls, law-enforcement records, national security alert lists and/or in any other suitable source of information. Such other source of information may include the mobile platform; informational data may be received, processed and/or stored in the course of the functioning of the mobile platform. Mobile platform informational data may pertain to the client; mobile platform informational data may be pertinent to correlation of identification information of the client. The correlation may be performed at the mobile platform and/or at a site accessible to the mobile platform.

The correlation may disconfirm the identity claimed by the client. The correlation may neither disconfirm nor confirm the identity claimed by the client. The correlation may confirm the identity claimed by the client. Confirmed identity of the client may be associated with other information pertaining to the client. The other information may pertain to the client's finances, to the client's legal status and/or to another suitable information-set pertaining to the client. Results of the correlation may supplement the identification information received from the client.

Processing of the identification information of the client may include the identification information being registered in a registry. The registry may be a database. The registry may be resident on the mobile platform and/or at a site accessible to the mobile platform. The registered identification information may include the results of the correlation. The registered identification information may be updated. Updating of the registered identification information may involve information associated with a subsequent correlation. Updating of the registered identification information may involve client-pertaining information not available prior to the subsequent correlation.

Updating of the registered identification information may involve the receiver subsequently receiving information. Updating of the registered identification information may involve the processor subsequently processing information. Updating of the registered identification information may involve previously received and/or processed information. Information of an update may include information descriptive of an impact of the event. Information descriptive of the impact of the event may be subject to confirmatory correlation with other information. The information of the update may include information from the client and/or pertinent to the client. The information of the update may be descriptive of the impact of the event upon the client Other information received from the client may involve a request from the client that a disaster-relief function of the invention be provided. The identification information of the client may serve as a basis for providing disaster-relief functions of the invention to the client.

The apparatus may include, and the methods and media may involve, a unit for producing a physical article of client-identification. Representative apparatus for production of the article of client-identification are Zebra ZXP Series 8 ID Card Printers available from Zebra Technologies Corporation (Lincolnshire, Ill.).

The article of client-identification may be an ATM card, a check and bank card, a credit card, a debit card, a stored-value card, a card with a magnetic strip, a bar-coded article, an instrument or device that includes a contactless chip, such as an ISO14443-compliant contactless chip, a cell phone, a personal data assistant or any other suitable electronic, encoded or information-bearing article.

The article of client-identification may feature a photographic identifier of the client. The article of client-identification may feature biometric data of the client.

The article of client-identification may incorporate an identification code, symbol, brand, mark and/or number unique to the article of client-identification. The article of client-identification may incorporate some or all of the registered identification information of the client. The article of client-identification may be produced for the client. The client-article of identification may be issued to the client. The issuing may involve physically associating the client-article of identification with the client.

The article of client-identification may be issued activated. The article of client-identification may be issued unactivated. Activation of the unactivated article of client-identification may require an activation step. The activation step may be a lapse of a delay period from issue.

The registered identification information and/or another stored client-related information-set may be updated to incorporate the issuing and/or activation of the article of client-identification. Updating of the information may involve the code, symbol, brand, mark and/or number unique to the article of client-identification. The issued article of client-identification may be deactivated.

The issued, activated article of client-identification may be used by the client. Use of the article of client-identification may require presentation of confirming input such as a knowledge-item (e.g., a PIN) and/or a biometric datum (e.g., an iris scan). Use of the article of client-identification may be limited to a designated location and/or time-period. Use of the article of client-identification may be limited to a designated usage. The designated limit(s) of location, time-period and/or usage may be updated. The article of client-identification may maintain a record of its location and/or use. The article of client-identification may transmit a record of its location and/or use.

The article of client-identification may at least in part authenticate the client for the client to be provided a disaster-relief function of the mobile platform. Presentation of the article of client-identification at the mobile platform may be required for the client to be provided the disaster-relief function. The client may request to be provided the disaster-relief function. The request may be received by the receiver. Information of the article of client-identification may be received by the receiver. The request and/or the information of the article of client-identification may be processed by the logic processing unit. The processing may involve the registered client-related identification information. The client may be provided the disaster-relief function. The registered client-related identification information may be updated to incorporate the request for, and/or the providing of, the disaster-relief function.

Banking Disaster-Relief

The requested disaster-relief function that may be provided the client may involve banking. The client that may be provided the banking disaster-relief functions may be a locale-associated resident/citizen, banking customer, entity-accountholder or any other suitable client. The banking disaster-relief function that may be provided the client may involve the MBU.

The banking disaster-relief function that the client may be provided may involve receiving from the client a request for access to a bank account. The request from the client for access to the account may be processed.

The request from the client for access to the account may be through the ATM. The processing of the request through the ATM may involve the authentication of the client as the accountholder. The processing of the request may involve the logic processing unit. The processing of the request may involve the communications unit.

The account may be a non-entity account. The client may be in possession of a non-entity account-associated ATM card. The request for access to the account may be processed as typical of use of an entity ATM by a non-entity ATM card-holder. The request for access to the non-entity account may be processed with a limit not typical of use of an entity ATM by a non-entity card-holder.

The account may be an entity account. The client may be in possession, from before the event, of an entity account-associated ATM card. Alternatively or additionally, the client may be in possession of an entity account-associated ATM card issued after the event. The entity account-associated ATM card issued after the event may be the issued article of client-identification. The request for access to the account may be processed as typical of use of an entity ATM by an entity ATM card-holder. The request for access to the entity account may be processed with a limit not typical of use of an entity ATM by an entity ATM card-holder.

The ATM may provide a full range of banking functions typical of ATMs. The range of banking functions provided by the ATM may be subject to a limit.

The limit on ATM use may be imposed by the entity; e.g., the amount of ATM funds withdrawn and/or deposited per transaction may be limited by the entity. The limit on ATM use may be imposed by a banking institution that is not the entity; e.g., a non-entity bank administering the account that the non-entity ATM card-holder client requests to access, may limit the frequency of ATM fund-withdrawal. The limit on ATM use may be imposed by the staff and/or the apparatus and methods of the mobile platform; e.g., the hours of ATM availability may be limited by a security function of the mobile platform. The limit on ATM use may be imposed by the authority/agency; e.g., the issued article of client-identification may have to be presented for the client to access the account through the ATM. The limit on ATM use may be subject to revision. The revision may correspond to review of the impact of the event on the locale. The review may be conducted in coordination with the authority/agency.

The request from the client for access to the account may be a request to establish an account to be administered by the entity; i.e., the request may be to open a new entity account, with the client as accountholder. The client opening the account may be outside the locale (e.g., the client may be an evacuee from the locale and/or a relative, friend or other benefactor of a party within the locale) and may designate an accountholder within the locale.

The client may be within the locale. The client may be in possession, from before the event, of assets that the client may wish to deposit in the new entity account. The assets may be cash in-hand. The assets may be bank-transferred from an existing account of which the client is an accountholder. The assets may be funds allotted to the client through the authority/agency (e.g., from FEMA and/or from an insurance company of the client).

The request from the client for access to the account may be a request to access banking functions offered by the entity account. Accessing banking functions offered by the entity account may involve the entity servicing the entity account.

Access to the banking functions of the account may require authentication of the client as the accountholder. Authentication of the client may require presentation by the client of accountholder-identification. Authentication of the client may require presentation by the client of the issued article of client-identification.

Authentication may result in granting the requested access to the account. Access to the account may offer a full range of banking functions typical of entity accounts. The account may offer banking functions with an extent in funds, location and/or time typical of entity accounts. The range and/or extent of banking functions offered by the entity account may be subject to a limit (e.g., the account may not feature overdraft privileges; the account may be accessible only at the mobile platform during specific hours). Another feature of banking functions offered by the entity account may be subject to a limit (e.g., client-bank confidentiality may be limited; informational data pertaining to the account may be selectively shared with the authority/agency). The limit on banking functions offered by the entity account may be imposed by the entity and/or the authority/agency. The limit on banking functions offered by the entity account may be imposed by the staff and/or by the apparatus and methods of the mobile platform.

The account may offer use of a banking card. The banking card may serve as a stored-value card. The account may offer ATM services; the account may offer use of an ATM card. The account may offer account checking; the account may offer use of a check card. The account may offer use of a debit card. The accountholder may be in possession, from before the event, of a banking, ATM, check and/or debit card associated with the entity account. Alternatively and/or additionally a banking, ATM, check and/or debit card associated with the entity account may be issued through the apparatus, methods and media, of the mobile platform. Use of the banking, ATM, check and/or debit card may require the issued article of client-identification. Use of the banking, ATM, check and/or debit card may be incorporated in the registry. The banking, ATM, check and/or debit card may be the issued article of client-identification.

Informational data generated—received, processed, registered, updated and/or stored—in the course of providing banking functions may reflect on a value of available and/or total funds resident on the mobile platform. Such informational data may be integrated with other informational data accessible to the mobile platform. Such integrated information may be used to assess current and projected resource-availability/need of the mobile platform and/or of the locale. Such assessment may be used to inform functions of the mobile platform. Such assessment may be shared with the authority/agency.

Business Disaster-Relief

The requested disaster-relief function that may be provided the client may involve business-support. The client that may be provided the business-support disaster-relief function may be a locale-associated business, institution, business banking customer, business entity-accountholder or any other suitable client. The issued article of client-identification and/or the registry may incorporate information related to the client being authorized to be provided business-support by the entity. The authorization may be arranged between the client and the entity before the event; e.g., a national chain of stores may have a standing financial arrangement with the entity for the entity to provide business-support to a chain-store in a disaster-impacted locale, the chain-store being the locale-associated client. The authorization may be arranged between the client and the entity and/or the mobile platform after the event; e.g., a locale-associated business may identify itself to the entity through the staff and/or apparatus and methods of the mobile platform, requesting business-support authorization that may be granted contingent upon confirmatory correlation of its platform-received information with other information.

The business-support disaster-relief function may be subject to a limit imposed by the entity and/or the authority/agency. The limit on the business-support disaster-relief function may be imposed by a body with authority over the locale-based business-support client; e.g., a regional franchiser may limit the business-support the entity may provide a locale-based franchisee; a state school system may limit the business-support the entity may provide a locale-based school's business office. The limit on the business-support disaster-relief function may be imposed by the staff and/or by the apparatus and methods of the mobile platform.

The business-support provided the client may involve banking. The business-support provided may be opening of a business entity account. The business-support provided may be servicing of a business entity account. Servicing of the business entity account may involve the entity extending loans to the client.

The business-support provided the client may involve electronic merchant services. The apparatus may include, and the methods and media may involve, a unit for providing electronic merchant services. The electronic merchant services provided by the staff and/or the apparatus, methods and media of the mobile platform may include card-transaction processing, check processing and/or any other suitable electronic merchant service.

Other electronic merchant service may include the staff and/or the apparatus, methods and media of the mobile platform providing the client with communications capabilities. The communications capabilities provided may involve the communications unit of the mobile platform for secure exchange of information between the mobile platform and sites within and/or beyond the locale.

The communications capabilities provided may include transmitting and/or receiving business wires. The communications capabilities provided may include business-to-business internet connectivity. Business-to-business internet connectivity may provide for critical business-to-business activity, such as inventory management and asset condition/capability reporting.

The communications capabilities provided may involve the issuing to the client of a remote communicating unit. The remote communicating unit may be configured for translocation to the client's site. The remote communicating unit may comprise a power-supplying unit. The remote communicating unit may be capable of using power supplied by the client. The remote communicating unit may be capable of securely communicating with client-site electronic merchant service equipment. The remote communicating unit may include a computer. The remote communicating unit may be configured to provide an electronic merchant service.

The remote communicating unit may be configured for communication with the mobile platform. The remote communicating unit may comprise its own transmitting and/or receiving unit. The remote communicating unit may communicate with the mobile platform as part of a local area network (LAN). The remote communicating unit may be capable of wireless communication via satellite to and/or from the mobile platform.

Use of the remote communicating unit may require presentation of the issued article of client-identification. Use of the remote communicating unit may enable the client to perform an electronic merchant service at the client's site despite impairment of locale-infrastructure. The electronic merchant service may include card-transaction processing and/or business-to-business internet connectivity.

Informational data generated in the course of providing business-support functions may allow for an estimate of the value of purchases made within the locale via entity banking cards, a tracking of goods and services moving into and/or sold within the locale and/or other business-related evaluations. Such informational data may be integrated with other informational data accessible to the mobile platform. Such integrated information may be used to assess current and projected resource-availability/need of the mobile platform and/or of the locale. Such assessment of may be used to inform functions of the mobile platform. Such assessment may be shared with the authority/agency.

Other Disaster-Relief

The requested disaster-relief function that may be provided the client may involve other disaster-relief functions. The other disaster-relief function may not be directly related to banking and/or business-support disaster-relief functions such as the aforementioned. The client that may be provided the other disaster-relief function may be a locale-associated citizen/resident, institution or any other suitable client. The issued article of client-identification and/or the registry may incorporate information related to the client being authorized to be provided other disaster-relief by the entity. The issued article of client-identification and/or the registry may incorporate information related to the client being provided disaster relief by the entity.

The disaster-relief may include providing the client capabilities of interfacing. The interfacing may involve the communications unit of the mobile platform for secure exchange of information between the mobile platform and sites within and/or beyond the locale. The interfacing may be with the authority/agency and/or with any other suitable party. Other parties with which interfacing may be provided may include a hospital, a church group and a relative of the client.

The interfacing may involve client-information being received and/or presented. The interfacing may involve the client receiving and/or presenting information. The client-information may involve the registered client-related identification information; e.g., client-status information sought by the authority/agency, the client's blood-type information sought by the hospital. The client-information may involve information sought by the client; e.g., information regarding welfare of the client's relative, information on the authority/agency's assessment of the impact of the event, information on filing an insurance claim.

The disaster-relief may include providing the client a service related to a non-entity body. The service provided the client may be a service of the non-entity body. The service may be issuing to the client a stored-value card. The value stored in the card may correspond to funds allotted the client by the non-entity body. The value stored in the card may be updated by the non-entity body. The value stored in the card may be deactivated by the non-entity body. The non-entity body may be the authority/agency, a charitable organization and/or any other suitable body. The stored-value card may be used by the client to pay for purchases of goods and/or services.

The stored-value card may be subject to a limit. The limit may be imposed by the entity and/or by the non-entity body. The stored-value card may be limited in the card's value, frequency of use, amount per use, location of use and in any other suitable limitable factor. Other limitable factors may include a duration of the card's activation and an identity of goods or services purchasable with the card. Limitable factors may be determined through assessment of availability of resources within the locale. The limit on the limitable factor may be subject to revision.

The disaster-relief may include providing the client an instrument by which the authority/agency may identify the client. The provided instrument may record and/or signal its location. The authority/agency may have a capability of tracking the client bearing the instrument. The provided instrument may be the stored-value card. The provided instrument may record and/or signal its use. The authority/agency may have a capability of following a buying pattern of the client using the instrument. Use of the instrument may require presentation of the issued article of client-identification. The instrument may be the issued article of client-identification.

The disaster-relief may involve maintaining a database of the impact of the event. The database may be updated in the course of the deployment of the mobile platform. The disaster-relief may involve providing information in the database to the client.

Informational data generated in the course of providing disaster-relief functions may allow for an estimate of the value of purchases made within the locale via stored-value cards, a tracking of client-movement within the locale, a measure of client-departure from the locale and/or other disaster-relief-related evaluations. Such informational data may be integrated with other informational data accessible to the mobile platform. Such integrated information may be used to assess current and projected resource-availability/need of the mobile platform and/or of the locale. Such assessment may be used to inform functions of the mobile platform. Such assessment may be shared with the authority/agency.

Illustrative embodiments of apparatus and methods in accordance with the principles of the invention may be described with reference to the accompanying drawings, which form a part hereof. It is to be understood that other embodiments may be utilized and structural, functional and procedural modifications may be made without departing from the scope and spirit of the present invention.

Figure 1:
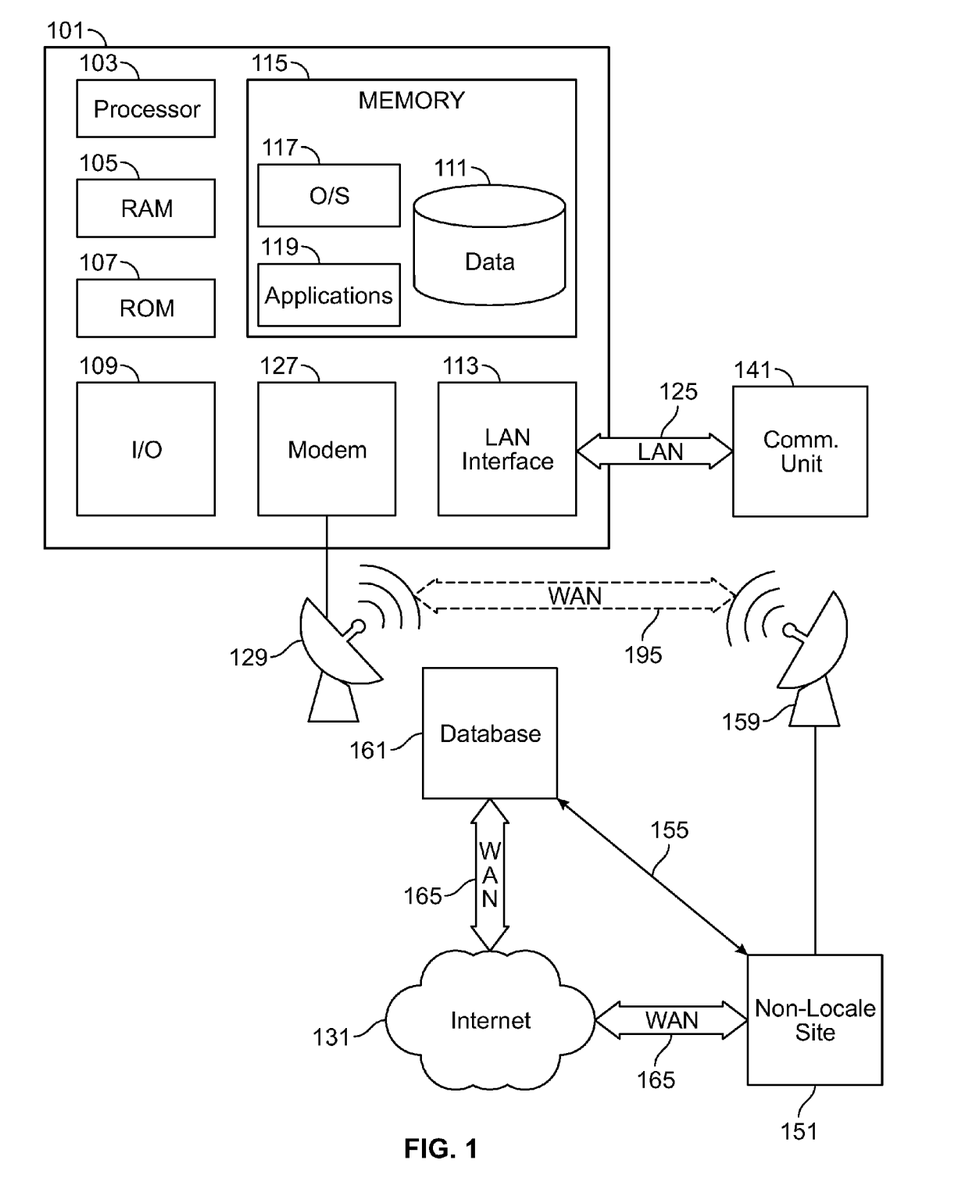
FIG. 1 is a block diagram of hardware apparatus that may be used in accordance with principles of the invention.

FIG. 1 is a block diagram that illustrates a generic computing device 101 (alternatively referred to herein as a "computer" and/or "server") that may be used according to an illustrative embodiment of the invention. The computer server 101 may be resident on the mobile platform. The computer server 101 may have a processor 103 for controlling overall operation of the server and its associated components, including RAM 105, ROM 107, input/output ("I/O") module 109, and memory 115.

I/O module 109 may include a microphone, keypad, touch screen, fingerprint reader, biometric scanner, camera and/or stylus through which a user of device 101 may provide input, and may also include one or more of a speaker for providing audio output and a video display device for providing textual, audiovisual and/or graphical output. Software may be stored within memory 115 and/or storage (not shown) to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Application programs 119 used by server 101 may contain, according to an illustrative embodiment of the invention, computer executable instructions for supporting disaster-relief functions.

Database 111 used by server 101 may provide, according to an illustrative embodiment of the invention, centralized storage of the informational data comprising the registry, facilitating interoperability of varied disaster-relief functions between different elements of the entity residing at different physical locations.

Server 101 may operate in a networked environment supporting connections to one or more remote elements, such as communication unit ("Comm. Unit") 141 and non-locale site 151. Remote elements 141 and 151 may include personal computers or servers that comprise many or all of the elements described above relative to server 101. The network connections depicted in FIG. 1 include a local area network (LAN) 125, wide area network (WAN) 165 and WAN 195, but may also include other networks. When used in a LAN networking environment, computer 101 may be connected to LAN 125 through a network interface or adapter 113. When used in a WAN networking environment, server 101 may include a modem 127 and/or other means for establishing communications (such as through satellite dish 129) over WAN 195. WAN 195 may allow communication between server 101 and non-locale site 151 (such as through satellite dish 159). Non-locale site 151 may communicate with database 161 through communication link 155. Non-locale site 151 may communicate with database 161 through WAN 165 and/or other means for establishing communications over WAN 165, such as Internet 131. Internet 131 may be available to server 101 through the networked environment. It will be appreciated that the network connections shown are illustrative and other means of establishing a communications link between the computers may be used. The existence of any of various well-known protocols such as TCP/IP, Ethernet, FTP, HTTP and the like is presumed, and that operations may be carried out in a client-server configuration to permit a user to retrieve web pages from a web-based server. Any of various conventional web browsers may be used to display and manipulate data on web pages.

Additionally, application programs 119 used by server 101, according to an illustrative embodiment of the invention, may include computer executable instructions for invoking user functionality related to communication, such as email, short message service (SMS), and voice input and speech recognition applications.

Computing device 101 and/or remote elements 141 or 151 may also be mobile terminals including various other components, such as a battery, speaker, and antennas (not shown).

Server 101, according to an illustrative embodiment of the invention, may implement disaster-relief functions as a process or set of processes within server 101 and/or distributed over one or more remote network-linked computers, such as may be included in remote elements 141 and 151.

Figure 2:
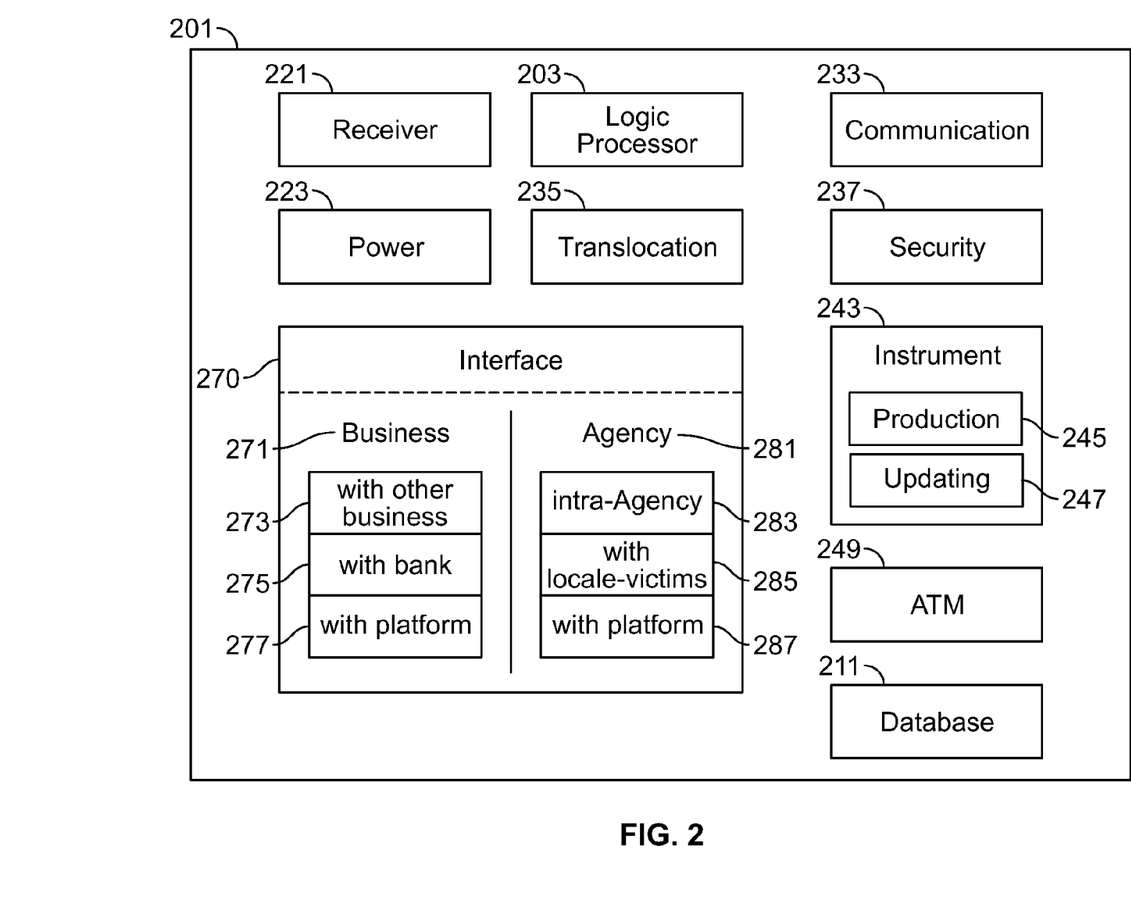
FIG. 2 is a block diagram of functional modules that may be used in accordance with principles of the invention.

FIG. 2 shows illustrative module 201 for providing disaster-relief functions in accordance with the principles of the invention. Module 201 may comprise several functional modules. Module 201 and its functional modules may correspond in whole or in part to devices, components and elements shown in FIG. 1. Functional modules of module 201 may be associated with each other in the course of providing disaster-relief functions, sharing in and overlapping functional operations. Functional modules of module 201 shown in FIG. 2: Power module 223 that may supply power to module 201 and its other functional modules; Security module 237 that may be charged with secure operation of module 201; Translocation module 235 that may implement transportation of module 201 and/or of its separately transportable components (not shown); Receiver module 221 that may receive informational data received in operation of disaster-relief functions; Logic Processor module 203 that may process informational data received in operation of disaster-relief functions; Database 211 that may store informational data received and processed in operation of disaster-relief functions; Communication module 233 that may coordinate communication functions among functional modules of module 201 and between module 201 and other sites both on the mobile platform and remote from it; ATM module 249 that may provide clients ATM services; Instrument module 243 that may make (through Production module 245) and maintain (through Updating module 247) issuable disaster-relief instruments such as articles of client-identification and stored-value cards (not shown); and Interface module 270 that may provide interfacing functions for business-supporting disaster-relief (through Business Interface module 271) and that may provide interfacing functions for and with the authority/agency (through Agency Interface module 281.)

Business Interface module 271 may provide several modes of business-support disaster-relief functions. Modes of business-support disaster-relief of Business Interface module 271 shown in FIG. 2: Mode 273 through which businesses may interface with businesses within and/or outside the locale; Mode 275 through which businesses may interface with entity and/or non-entity banks; and Mode 277 through which businesses may interface with modules and functionalities of the mobile platform.

Agency Interface module 281 may provide several modes of agency interfacing disaster-relief functions. Modes of agency interfacing disaster-relief of Agency Interface module 281 shown in FIG. 2: Mode 283 through which authority/agency activities may be coordinated; Mode 285 through which interfacing is conducted with locale-associated residents/citizenry and institutions; and Mode 287 through which the authority/agency may interface with modules and functionalities of the mobile platform.

Figure 3:
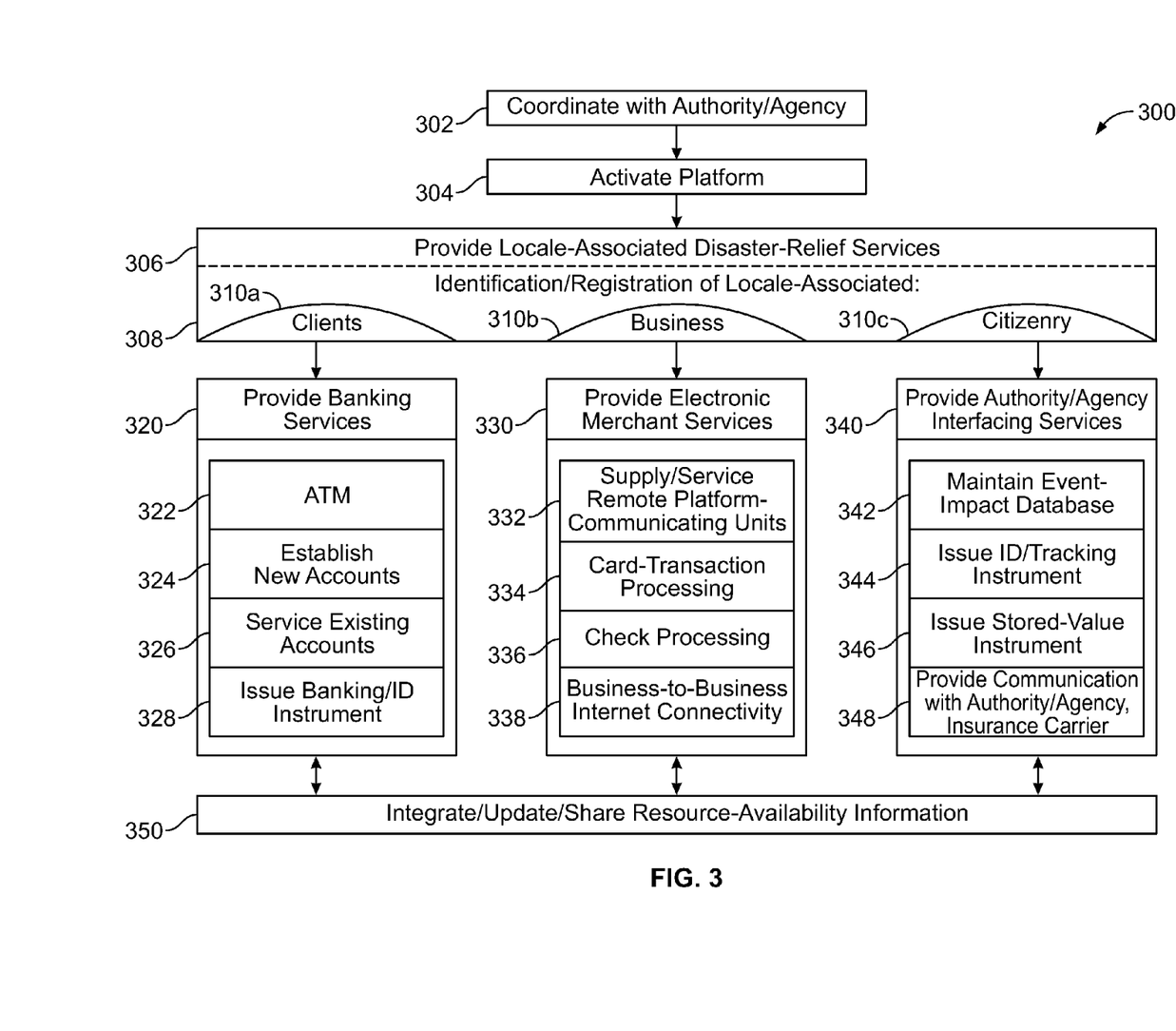
FIG. 3 is an illustrative flow diagram of a process in accordance with principles of the invention.

Processes in accordance with the principles of the invention may include one or more features of the processes illustrated in FIG. 3. For the sake of illustration, steps of the illustrated processes will be described as being performed by a "system." The "system" may include one or more of the features of the apparatus shown in FIG. 1, of the functional modules shown in FIG. 2 and/or of any other suitable device or approach. The "system" may be provided by the entity implementing disaster-relief functions of the invention or by any other suitable individual, organization or modality. The order of performance and/or description of steps of the processes in FIG. 3 is illustrative only. Each of the described steps need not be completed in the illustrated order or at all.

FIG. 3 shows illustrative process 300 for providing disaster-relief functions in accordance with the principles of the invention. At step 302, the system may coordinate with the authority/agency. The coordination may be with respect to determination of the practicality and safety of deployment of the mobile platform; of the timing and/or location of the deployment; of the selection and extent of disaster-relief functions of the mobile platform to be activated upon deployment; and/or of other aspects of the staff, apparatus, methods and media of the mobile platform that may be determined prior to activation of the mobile platform at step 304.

Activation of the mobile platform at step 304 may be performed as a single step activating all functionalities of the mobile platform. Activation of the mobile platform may be performed in discrete steps. Activation of the mobile platform may be partial, activating selected functionalities. The activated mobile platform may be deactivated. The deactivated mobile platform may be re-activated. Activation, deactivation and re-activation may be coordinated with the authority/agency, may be determined by locale-associated "facts on the ground" at the time and/or location of deployment, and/or may be carried out in response to any suitable circumstance.

At step 306, the system may provide locale-associated disaster-relief services in accord with the extent of activation of step 304. Step 308 may be common to all disaster-relief services that the system may provide in step 306: At step 308, identification and registration may be carried out of locale-associated individuals and institutions. Locale-associated individuals and institutions that may be processed in step 308 may include those that may request banking disaster-relief services (depicted by Clients 310*a*); those that may request business-support disaster-relief services (depicted by Business 310*b*); and those that may request other disaster-relief services (depicted by Citizenry 310*c*). Identification may require confirmatory correlation with other information (not shown). Identification of Business individuals and institutions may require authorization (not shown). Identification may be accompanied or followed by registration of the individual or institution. Registration of the identification information of individuals and/or institutions may be updated (not shown).

At step 320, the system may provide banking disaster-relief services to Clients 310*a*. Provide Banking Services 320 may provide individuals and institutions access to bank accounts and other banking functions. Provide Banking Services 320 may comprise: ATM 322 (at which step, access to entity accounts and/or to non-entity accounts may be provided via ATM); Establish New Accounts 324 (at which step, new entity banking accounts may be opened); Service Existing Accounts 326 (at which step, a range of entity account bank services may be provided); and Issue Banking/ID Instrument 328 (at which step, access to accounts may be provided through issuance of a banking instrument such as a check/debit card and/or an identification card by which an individual or institution may be identified by the mobile platform without requiring re-processing via 310*a* of step 308).

At step 330, the system may provide business-support disaster-relief services to Business 310*b*. Provide Electronic Merchant Services 330 may provide individuals and institutions access to business bank accounts and other business-support functions. Provide Electronic Merchant Services 330 may comprise: Supply/Service Remote Platform-Communicating Units 332 (at which step, mobile platform-networked communication units that may be supplied to Business 310*b* sites distinct from the location of deployment may provide business-site-based access to electronic merchant services such as those depicted in steps 334, 336 and 338); Card-Transaction Processing 334 (at which step, business transactions that may be executed through credit/debit cards or similar purchase instruments may be processed at the mobile platform or, via the communication units of step 332, at business-sites); Check Processing 336 (at which step, business transactions that may be executed through checks or similar purchase instruments may be processed at the mobile platform or, via the communication units of step 332, at business-sites); and Business-to-Business Internet Connectivity 338 (at which step, access may be provided to internet and other sources of communication/information via the communication units of step 332 and/or communication functionalities of the mobile platform (not shown)).

At step 340, the system may provide banking disaster-relief services to Citizenry 310c. Provide Authority/Agency Interfacing Services 340 may provide locale-associated individuals and institutions access to information associated with the authority/agency and may provide the authority/agency access to informational-data pertaining to locale-associated individuals and institutions. Provide Authority/Agency Interfacing Services 340 may comprise: Maintain Event-Impact Database 342 (at which step, event-impact informational data associated with Citizenry 310c and associated with the authority/agency may be stored, correlated together with other event-impact information, and updated); Issue ID/Tracking Instrument 344 (at which step, interfacing with the authority/agency may be provided through issuance of an instrument such as a programmed cell phone and/or an identification card by which an individual or institution may be identified by the authority/agency without requiring re-processing via 310c of step 308; such instrument may feature tracking functions providing the authority/agency information associated with location and activity of the instrument); Issue Stored-Value Card 346 (at which step, interfacing with the authority/agency may be provided through issuance of an instrument such as a pre-loaded check/debit card for disbursement of authority/agency funds; such instrument may feature tracking functions providing the authority/agency information associated with location and activity of the instrument); and Provide Communication with Authority/Agency, Insurance Carrier 348 (at which step, Citizenry 310c may be provided interfacing with the authority/agency—which may comprise insurance companies handling locale-associated claims—allowing for information-exchange that may pertain to event-impact, the authority/agency and/or Citizenry 310c.)

At step 350, informational data generated in steps 320, 330 and 340 may be collected and correlated. Such collected and correlated informational data may be pertinent to availability of resources at the mobile platform and/or within the locale. Such collected and correlated data may inform the functions of steps 320, 330 and 340, as depicted by the double-headed arrows between those steps and step 350.

The system may use Integrate/Update/Share Resource-Availability Information 350 to inform other steps of process 300, such as steps 304 (e.g., triggering deactivation/re-activation) and step 306 (e.g., modifying the range of disaster-relief functions provided) (not shown).

As will be appreciated by one of skill in the art, the invention described in the aforementioned steps and parts of the figures and in the specification herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Thus, apparatus, methods and media for providing disaster-relief services according to the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. One or more non-transitory computer readable media having code stored thereon which, when executed by a processor, facilitates a method of supporting a disaster-relief effort in a locale impacted by an event that impairs locale-infrastructure, said supporting provided by an entity in coordination with an agency with authority over the locale, the method comprising:

activating an entity-associated mobile platform in the locale in response to the event, the platform equipped to provide secure services for banking, data-handling and communications, the secure services for banking comprising providing access through a platform-provided automated teller machine ("ATM") to an account maintained by the entity for an accountholder;

designating a service to be provided in the locale by the entity, the service designated in coordination with the agency, wherein, when the service is a banking service, the service comprises an offer of disbursement of accountholder funds, including providing cash-in-hand via the ATM;

receiving a request from a locale-associated client for the service;

authenticating the client, wherein, when the service is a banking service, the client is the accountholder;

providing the service to the client through the platform; and providing a platform-based communication hub for a locale associated business, the hub in communication with a remote communicating unit activated by the entity on behalf of the business, the remote communication unit enabling, at a site of the business, an electronic merchant activity, the activity comprising card-transaction processing and/or business-to-business internet connectivity.

2. The media of claim 1, wherein, in the method, the activating the platform comprises translocation of the platform relative to the locale.

3. The media of claim 1, wherein, in the method, the authenticating comprises registering client-related information in a registry maintained by the entity.

4. The media of claim 3, wherein, in the method, the authenticating comprises comparing the client-related information of the registry with other information.

5. The media of claim 4, wherein, in the method, the other information comprises information associated with a non-entity database.

6. The media of claim 1, wherein, in the method, the service comprises issuing a card associated with a value, the value corresponding to funds set by the agency.

7. The media of claim 6, wherein the method further comprises tying the agency-set funds to an insurance provider.

8. The media of claim 6, wherein the method further comprises imposing a time limit on the validity of the card.

9. The media of claim 6, wherein the method further comprises imposing a geographic limit on the validity of the card.

10. The media of claim 1, wherein, in the method, the providing the service comprises disbursing funds.

11. The media of claim 1, wherein, in the method, the providing the service comprises issuing a physical article of client-identification.

12. The media of claim 11, wherein, in the method, the physical article comprises a device that includes an electronic chip bearing information.

13. The media of claim 12, wherein the method further comprises monitoring a geographic location of the physical article.

14. The media of claim 12, wherein the method further comprises updating the physical article.

15. The media of claim 12, wherein, in the method, the authenticating comprises utilizing information associated with the physical article.

16. The media of claim 1, wherein, in the method, the providing the service comprises providing communication-interfacing capabilities.

17. The media of claim 1, wherein the method further comprises maintaining event-related locale-information.

18. The media of claim 17, wherein the method further comprises providing access to the locale-information.

19. The media of claim 18, wherein, in the method, the providing access to the locale-information comprises transmitting the locale-information.

20. The media of claim 1, wherein the method further comprises providing a communication hub for the agency via the platform.

21. An apparatus for supporting a disaster-relief effort in a locale impacted by an event that impairs locale-infrastructure, said supporting provided by an entity in coordination with an agency with authority over the locale, the apparatus comprising:

an entity-associated mobile platform configured to be activated in the locale in response to the event, the platform equipped to provide secure services for banking, data-handling and communications, the secure services for banking comprising providing access through a platform-provided automated teller machine ("ATM") to an account maintained by the entity for an accountholder;

a logical processing device configured to designate a service to be provided in the locale by the entity through the platform, the service designated in coordination with the agency, wherein, when the service is a banking service, the service comprises the platform providing an offer of disbursement of accountholder funds, including providing cash-in-hand via the ATM;

a receiver device configured to receive a request from a locale-associated client for the service, wherein, when the service banking service, the client is the accountholder;

a communication device configured, in conjunction with the receiver device and the logical processing device, to authenticate the client and to signal authorization to grant the client the service through the platform; and a platform-based communication hub for a locale-associated business, the hub in communication with a remote communicating unit activated by the entity on behalf of the business, the remote communication unit providing, at a site of the business, an electronic merchant service, the service comprising card-transaction processing and/or business-to-business internet connectivity.

* * * * *